United States Patent
Kalopissis et al.

[15] 3,666,812
[45] May 30, 1972

[54] DIAMINO PHENOL HAIR DYEING COMPOUNDS

[72] Inventors: Gregoire Kalopissis, Paris; Andree Bugaut, Boulogne sur Seine, both of France

[73] Assignee: Societe Anonyme Dite: L'Oreal, Paris, France

[22] Filed: June 12, 1967

[21] Appl. No.: 645,519

Related U.S. Application Data

[60] Continuation-in-part of Ser. No. 574,860, July 11, 1966, abandoned, which is a division of Ser. No. 293,282, July 3, 1963, abandoned.

[30] Foreign Application Priority Data

July 11, 1962  France..................................903703
July 3, 1963   France..................................940212

[52] U.S. Cl...................................260/574, 260/575, 8/10, 8/10.1
[51] Int. Cl...........................................C07c 91/44
[58] Field of Search.................................260/575, 574, 573

[56] References Cited

UNITED STATES PATENTS 3,134,721   5/1964   Seemuller..........................260/574 X
3,184,387   5/1965   Seemuller..............................424/330

FOREIGN PATENTS OR APPLICATIONS 802,554   10/1958   Great Britain........................424/330

*Primary Examiner*—Charles B. Parker
*Assistant Examiner*—Charles F. Warren
*Attorney*—Holcombe, Wetherill & Brisebois

[57] ABSTRACT

Compounds suitable for use in one step hair and keratin fiber dyeing compositions which do not require the use of separate dye modifiers and are exceptionally color stable, having the formula

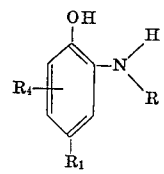

in which R is selected from the group consisting of hydrogen and alkyl, $R_1$ is selected from the group consisting of alkyl, alkoxy, and dialkylamino, $R_4$ which can be in position 5 or 6 on the ring is selected from the group consisting of hydrogen, halogen, hydroxy, alkyl, alkoxy and $NH_2$, and at least one of sakd $R_1$ and $R_4$ is said dialkylamino or said $NH_2$.

6 Claims, No Drawings

DIAMINO PHENOL HAIR DYEING COMPOUNDS

This application is a continuation-in-part of application 574,860 filed July 11, 1966 now abandoned, which is a division of application 293,282, filed July 8, 1963 now abandoned.

This invention relates to improved compounds suitable for use in one step keratin fiber and hair dyeing compositions.

A number of compounds for dyeing keratinic fibers and notably hair are at present known; among the most commonly employed of these compounds are those which use oxidation dyes whose coloration results from polymerization under oxidizing conditions.

In practice, the oxidation dyes employed are almost exclusively mixtures of aromatic diamines and aromatic aminophenols, generally known as "bases", in combination with substances, generally called "modifiers", such as substituted or unsubstituted mono- and polyphenols. It is possible, by using a relatively limited number of aromatic bases and phenols, to obtain a fairly wide range of colorations, the proportions of the various constituents which enter into the composition of the dye bath being empirically varied. However, the formation of hair-coloring pigments from these mixtures results from a series of very complex chemical reactions which necessitate either the use of an oxidizing substance, almost exclusively hydrogen peroxide, or the presence of a substance having an alkaline reaction, which is generally ammonia. It is also known that by increasing the hydrogen peroxide and ammonia content there is obtained what is known as a "decolorizing dye", there being simultaneously produced a decoloration of the hair to be dyed and a hair coloration in the desired shade.

It is well known that the hair-dyeing processes mentioned above have many disadvantages arising out of the mode of formation of the pigments imparting the coloration to the hair. In the first place, the use of para-diamines is likely to produce dermatitis and even allergies in certain particularly sensitive people. On the other hand, the necessary presence of alkali and of hydrogen peroxide leads to modifications of the structure of the hair, which may sometimes be undesirable. Moreover, the shades obtained by present techniques have a well known tendency to change in the course of time. Thus, the colorations often tend to turn towards red; this is an appreciable disadvantage.

If, in this state of the art, that is to say, when an aromatic base and a "modifier" are used in combination, only known bases were to be employed, either alone or in admixture, products would be obtained which would have the aforesaid disadvantages in a higher degree and which, in addition, would give very limited ranges of shades.

According to the present invention it has now been discovered that it is possible to dye living hair without the use of the modifiers hitherto traditionally employed, provided that the aromatic bases heretofore employed are replaced by other selected products capable of developing a characteristic shade, which never varies, without the aid of an oxidizing or modifying agent. It has also been discovered that it is possible to use for this purpose solutions of these selected products having a slightly basic pH value, which may be as low as 7.

In this way, each of the selected bases employed develops its own shade. Consequently, an extensive range of commercially necessary shades may be made available merely by employing a number of these products, the final shade obtained being the component of the individual shades of the starting materials.

The present invention provides compounds which have the formula

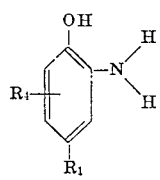

in which $R_1$ is selected from the group consisting of methoxy dimethylamino and diethylamino, $R_4$ which can be in position 5 or 6 on the ring is selected from the group consisting of hydrogen, and $NH_2$ provided that when $R_4$ is hydrogen then $R_1$ is diethylamino. Preferably when $R_1$ is a dialkylamino and alkyl and $R_4$ is an alkyl, they are low molecular weight alkyls.

A number of preferred compounds of this invention are : 6-amino-4-methoxy-2-aminophenol, 5-amino-4-methoxy-2-aminophenol, 6-amino-4-dimethylamino-2-aminophenol, 6-amino-4-diethylamino-2-aminophenol and 4-N,N-diethylamino-2-aminophenol.

Used in dyeing solutions containing no oxidizing agent and no modifier and having a value equal to or higher than 7, viz from 7 to 11, the compounds are oxidized by atmospheric oxygen. Furthermore, the dyeing solution may contain, in addition to the aforesaid compound or compounds, hydrogen peroxide and an alkali in amounts which effect a decolorizing dyeing effect without modifying the dye compounds.

The compounds of this invention make it possible to obtain greatly improved hair dyes that are color stable and do not require a modifier; since each of the aforesaid bases develops its own shade as the result of air oxidation, it is possible to obtain all the shades required in practice by simply mixing two or more of these bases.

In using these compounds for hair dyeing they may be stocked and brought into solution in the form of their salts, for instance in the form of their hydrochlorides or hydrobromides. When a base such as ammonia is added to this solution, the compounds are set free or activated at the time of use.

Preferred hair dye compositions are aqueous solutions containing 0.5 to 5 percent by weight of the dye compound and which have a pH of 7 to 11.

The following examples illustrate a number of preferred embodiments of this invention.

EXAMPLE 1

PREPARATION OF 2,6-DIAMINO-4-METHOXYPHENOL

The starting material 2,6-dinitro-4-methoxyphenol which is reduced in the usual way by means of a mixture of hydrochloric acid and tin.

There is thus obtained the corresponding dihydrochloride which, when recrystallized from hydrochloric acid, takes the form of white crystals.

Analysis

| | Calculated | Found |
|---|---|---|
| | C% 36.99 | C% 36.69–36.78 |
| | H% 5.28 | H% 5.23–5.25 |
| | N% 12.33 | N% 12.34–12.51 |

EXAMPLE 2

PREPARATION OF 2,6-DIAMINO-4-DIETHYLAMINOPHENOL

The starting material 2,6-dinitro-4-diethylaminophenol is reduced with a mixture of tin and hydrochloric acid. The product is thereafter liberated by passing a current of hydrogen sulphide over the chloro-stannate intermediate thus obtained.

Analysis

| | Calculated | Found |
|---|---|---|
| | C% 39.40 | C% 39.38–39.74 |
| | H% 6.56 | H% 6.27–6.51 |
| | N% 13.80 | N% 13.98–13.62 |

EXAMPLE 3

PREPARATION OF 2,6-DIAMINO-4-DIMETHYLAMINOPHENOL TRIHYDROCHLORIDE

The procedure indicated in Example 2 is followed, except that there is employed as starting material 2,6-dinitro-4-dimethylaminophenol instead of 2,6-dinitro-4-diethylaminophenol.

EXAMPLE 4

PREPARATION OF 5-AMINO-4-METHOXY-2-AMINOPHENOL 4-methoxy-2-aminophenol is first converted into 5-methoxy-benzoxazole. For this purpose, 4-methoxy-2-aminophenol is treated with acetic anhydride under reflux, and the mixture thereafter distilled under normal pressure. By nitration of the 5-methoxybenzoxazole thus obtained with a mixture of sulphuric and nitric acids between 0° and 5° C., 5-methoxy-6-nitrobenzoxazole is obtained. The latter product is reduced in the usual way by means of hydrochloric acid and tin. In the course of the reduction, the oxazole ring opens and there is obtained, after cooling and separation, the dihydrochloride of 2,5-diamino-4-methoxyphenol.

Analysis

| Calculated | Found |
|---|---|
| C% 37.00 | C% 36.79–37.38 |
| H% 5.28 | H% 5.23–5.39 |
| N% 12.33 | N% 12.13–11.97 |

EXAMPLE 5

PREPARATION OF 4-N,N-DIETHYLAMINO-2-AMINOPHENOL

4-N,N-diethylamino-2-aminophenol is prepared from 2-nitro-4-N,N-diethylamine anisole which is reduced with iron and acetic acid. The resulting product is then refluxed in a concentrated solution of hydrobromic acid. After cooling, the 4-N,N-diethylamino-2-aminophenol crystallized in the form of its di-hydrobromide.

Analysis

| Calculated | Found |
|---|---|
| N% 8.18 | N% 8.05–8.22 |

EXAMPLE 6

A dyeing solution according to the invention is prepared by mixing:

| | |
|---|---|
| 6-amino-4-methoxy-2-aminophenol sulphate. | 2.5 g. |
| sodium carbonate, q.s. for pH 7, | |
| water q.s. for. | 100 cc. |

This solution is applied to hair containing 90 percent of white hairs and left in contact therewith for 15 to 20 minutes. After washing and rinsing, a khaki coloration is obtained.

EXAMPLE 7

A dyeing solution according to the invention is prepared by mixing:

| | |
|---|---|
| 6-amino-4-methoxy-2-aminophenol sulphate. | 2.5 g. |
| N/1 sodium carbonate, q.s. for pH 7, | |
| 20% ammonia. | 5 cc. |
| water q.s. for | 100 cc. |

To the mixture thus prepared are added 8 cc. of hydrogen peroxide (130 vol.). The solution obtained is applied to brown hair containing 90 percent of white hairs. After 20 minutes, the hair is rinsed and then shampooed. A dark ash-blond coloration is obtained.

EXAMPLE 8

A dyeing solution according to the invention is prepared by mixing:

| | |
|---|---|
| 6-amino-4-diethylamino-2-aminophenol trihydrochloride | 3 g. |
| sodium hydroxide q.s. for pH 7, | |
| water q.s. for. | 100 cc. |

By applying this solution to hair containing 90% of white hairs and leaving it in contact therewith for 15 to 20 minutes and thereafter washing and rinsing it, a strong green coloration is imparted to the hair.

EXAMPLE 9

A dyeing solution according to the invention is prepared by mixing:

| | |
|---|---|
| 6-amino-4-diethylamino-2-aminophenol trihydrochloride. | 3 g. |
| N/1 sodium hydroxide, q.s. for pH 7, | |
| 20% ammonia. | 4 cc. |
| diethylenetriaminepentaacetic acid, sodium salt | 0.5 g. |
| water q.s. for | 100 cc. |

This solution, when mixed with 8 cc. of hydrogen peroxide (100 vol.) and applied to brown hair containing 60 percent of white hairs, gives after a contact period of 25 minutes, rinsing and shampooing, a light brown coloration having green reflections.

EXAMPLE 10

A dyeing solution according to the invention is prepared by mixing:

| | |
|---|---|
| 5-amino-4-methoxy-2-aminophenol dihydrochloride. | 2 g. |
| sodium hydroxide q.s. for pH 7, | |
| water q.s. for. | 100 cc. |

By applying this solution to hair containing 90 percent of white hairs, and leaving it in contact therewith for 15 to 20 minutes and thereafter washing and rinsing it, the hair is given a strong violet coloration.

EXAMPLE 11

A dyeing solution according to the invention is prepared by mixing:

| | |
|---|---|
| 5-amino-4-methoxy-2-aminophenol dihydrochloride. | 2g. |
| N/1 sodium hydroxide, q.s. for pH 7 | |
| 20% ammonia. | 6 cc. |
| sodium bisulphite | 2.5 g. |
| water q.s. for | 100 cc. |

With this solution are mixed 8 cc. of hydrogen peroxide (130 vol.) whereafter it is applied to light brown hair containing 60 percent of white hairs. After a contact period of 20 to 25 minutes, rinsing and shampooing, a dark blond coloration tinged with violet-pink is obtained.

EXAMPLE 12

A dyeing solution according to the invention is prepared by mixing:

| | |
|---|---|
| 4-N,N-diethylamino-2-aminophenol, dihydrobromide. | 3 g. |
| sodium carbonate q.s. for pH 7, | |
| water q.s. for. | 100 cc. |

By applying this solution to hair containing 90 percent of white hairs and leaving it in contact therewith for about 20 minutes, the hair is given a chestnut pink coloration, after washing and rinsing.

EXAMPLE 13

A dyeing solution according to the invention is prepared by mixing:

| | |
|---|---|
| 4-methoxy-2-aminophenol hydrochloride. | 0.15 g. |
| 6-amino-4-diethylamino-2-aminophenol trihydrochloride | 0.15 g. |
| 4-methoxy-2-amino-(β-hydroxyethyl) aniline | 0.8 g. |
| sodium carbonate, q.s. for pH 7, | |
| water q.s. for | 100 cc. |

This solution is applied to light brown hair containing 80% of white hairs. It is left in contact therewith for 20 minutes and after washing and rinsing the hair has a light gold-brown tint.

EXAMPLE 14

A dyeing solution according to the invention is prepared by mixing:

| | |
|---|---|
| 4-methoxy-2-aminophenol hydrochloride. | 0.15 g. |
| 6-amino-4-diethylamino-2-aminophenol trihydrochloride. | 0.15 g. |
| 4-methoxy-2-amino-(β-hydroxyethyl) aniline | 0.8 g. |
| N/1 sodium hydroxide, q.s. for pH 7, | |
| 20% ammonia | 5 cc. |
| water q.s. for | 100 cc. |

There are added to this solution at the time of use 8 cc. of hydrogen peroxide (130.), whereafter it is applied to brown colored hair containing 80 percent of white hairs. After a contact period of 25 minutes, rinsing and shampooing, a light red-brown coloration is obtained.

EXAMPLE 15

A dyeing solution according to the invention is prepared by mixing:

| | |
|---|---|
| 4-methoxy-2-aminophenol hydrochloride. | 0.5 g. |
| 4-methoxy-2-amino-(β-hydroxyethyl) aniline | 0.3 g. |
| 5-amino-4-methoxy-2-aminophenol dihydrochloride | 0.2 g. |
| sodium carbonate, q.s. for pH 7, | |
| water q.s. for | 100 cc. |

By applying this solution to light brown hair containing 90 percent of white hairs and leaving it in contact therewith for 15 to 20 minutes and thereafter washing and rinsing it, there is imparted to the hair thus treated a mauvish dark ash-blond coloration.

EXAMPLE 16

A solution according to the invention is prepared by adding to the solution described in Example 6, 5 cc. of 20 percent ammonia and 8 cc. of hydrogen peroxide (130 vol.).

By applying this solution in the same way as above to brown hair containing 50 percent of white hair, a golden light brown coloration is obtained.

EXAMPLE 17

The following solution is prepared:

| | |
|---|---|
| 6-amino-4-methoxy-2-aminophenol sulphate. | 3 g. |
| 20% ammonia. | 7 cc. |
| water q.s. for | 100 cc. |

Fifty cc of this solution are mixed with 50 cc of a hydrogen peroxide solution and applied to hair containing 90 percent of white hairs. After 25 minutes of contact, the hair is shampooed, rinsed and dried.

It has a blond coloration.

EXAMPLE 18

The following solution is prepared:

| | |
|---|---|
| 5-amino-4-methoxy-2-aminophenol dihydrochloride. | 2.3 g. |
| sodium carbonate q.s. for pH 7 | |
| 20% ammonia. | 7 cc. |
| water q.s. for | 100 cc. |

Fifty cc of this solution are mixed with 50 cc of a hydrogen peroxide solution and applied to hair containing 90 percent of white hairs. After 25 minutes of contact, the hair is shampooed, rinsed, and dried.

It has an ash blond tint with mauve glints.

EXAMPLE 19

The following solution is prepared:

| | |
|---|---|
| 6-amino-4-dimethyl-2-aminophenol dihydrochloride. | 3 g. |
| sodium carbonate q.s. for pH 7. | |
| 20% ammonia. | 7 cc. |
| water q.s. for | 100 cc. |

Fifty cc of this solution are mixed with 50 cc of a hydrogen peroxide solution and applied to hair containing 90 percent of white hairs. After 25 minutes of contact, the hair is washed, rinsed and dried.

It has a blond coloration.

EXAMPLE 20

The following solution is prepared:

| | |
|---|---|
| 4-methyl-5-hydroxy-2-aminophenol hydrochloride. | 0.5 g. |
| 4-methoxy-2-aminophenol hydrochloride | 0.1 g. |
| 6-amino-4-methoxy-2-aminophenol hydrochloride | 0.5 g. |
| sodium carbonate q.s. for pH 7 | |
| water q.s. for. | 100 cc. |

Fifty cc of this solution are mixed with 50 cc of a hydrogen peroxide solution and applied to hair containing 90 percent of white hairs. After 25 minutes of contact, the hair is shampooed, rinsed and dried.

It has a deep brown violet tint.

EXAMPLE 21

The following solution is prepared:

| | |
|---|---|
| 4-methyl-5-hydroxy-2-methylaminophenol hydrochloride. | 0.5 g. |
| 6-amino-4-diethylamino-2-aminophenol trihydrochloride | 0.4 g. |
| 4-methoxy-2-amino (β-hydroxyethylaniline) | 0.1 g. |
| sodium carbonate q.s. for pH 7 | |
| water q.s. for. | 100 cc. |

Fifty cc of this solution are mixed with 50 cc of a hydrogen peroxide solution and applied to hair containing 90 percent of white hairs. After 25 minutes of contact, the hair is shampooed, rinsed and dried.

It has a light golden brown tint.

EXAMPLE 22

The following solution is prepared:

| | |
|---|---|
| 2-chloro-5-amino-hydroquinone hydrochloride. | 0.5 g. |
| 6-amino-4-methoxy-2-aminophenol sulphate | 0.5 g. |
| 2-methyl-5-amino-hydroquinone hydrochloride | 0.1 g. |
| sodium carbonate q.s. for pH 7 | |
| water q.s. for. | 100 cc. |

Fifty cc of this solution are mixed with 50 cc of a hydrogen peroxide solution and applied to hair containing 90 percent of white hairs. After 25 minutes of contact, the hair is shampooed, rinsed and dried.

It has a flat dark brown tint.

What is claimed is:

1. A compound having the formula:

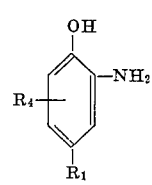

in which $R_1$ is selected from the group consisting of methoxy, dimethylamino, and diethylamino, $R_4$ in position 5 or 6 on the ring is selected from the group consisting of hydrogen and $NH_2$ provided that when $R_4$ is hydrogen then $R_1$ is —$N(C_2H_5)_2$.

2. The compound formula of claim 1, wherein said compound is 6 amino-4-methoxy-2-aminophenol.

3. The compound formula of claim 1, wherein said compound is 5-amino-4-methoxy-2-aminophenol.

4. The compound of claim 1, wherein 6-amino-4-dimethylamino-2-aminophenol.

5. The compound of claim 1, wherein 6-amino-4-diethylamino-2-aminophenol.

6. The compound of claim 1, wherein 4-diethylamino-2-aminophenol.

* * * * *